(12) United States Patent
Orth et al.

(10) Patent No.: US 7,525,419 B2
(45) Date of Patent: Apr. 28, 2009

(54) TRANSMITTER WITH REMOVABLE LOCAL OPERATOR INTERFACE

(75) Inventors: Kelly M. Orth, Apple Valley, MN (US); Mark S. Schumacher, Minneapolis, MN (US); Christopher A. Wells, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 232 days.

(21) Appl. No.: 11/343,058

(22) Filed: Jan. 30, 2006

(65) Prior Publication Data

US 2007/0191970 A1  Aug. 16, 2007

(51) Int. Cl.
G08B 29/00 (2006.01)
(52) U.S. Cl. .................. 340/506; 340/584; 340/870.07
(58) Field of Classification Search ................. 340/506, 340/584, 870.07; 714/11; 700/25; 710/264; 702/116
See application file for complete search history.

(56) References Cited

U.S. PATENT DOCUMENTS

| | | | |
|---|---|---|---|
| 524,752 A | 8/1894 | Bohm ..................... 340/815.4 |
| 1,171,715 A | 2/1916 | Griffith et al. ........... 340/815.53 |
| 2,818,560 A | 12/1957 | Edrich et al. ................ 340/372 |
| 3,701,280 A | 10/1972 | Stroman ...................... 73/194 |
| 3,968,694 A | 7/1976 | Clark .......................... 73/398 |
| 4,120,206 A | 10/1978 | Rud, Jr. ....................... 73/718 |
| 4,125,027 A | 11/1978 | Clark .......................... 73/724 |
| 4,184,153 A | 1/1980 | Glaubitz ..................... 340/765 |
| 4,238,825 A | 12/1980 | Geery ......................... 364/510 |
| 4,250,490 A | 2/1981 | Dahlke .................. 340/870.37 |
| 4,287,501 A | 9/1981 | Tominaga et al. ............. 338/42 |
| 4,377,809 A | 3/1983 | Lawford ..................... 340/623 |
| 4,414,634 A | 11/1983 | Louis et al. ................. 364/510 |
| 4,419,898 A | 12/1983 | Zanker et al. ............. 73/861.02 |
| 4,446,730 A | 5/1984 | Smith .......................... 73/301 |
| 4,455,875 A | 6/1984 | Guimard et al. ............... 73/708 |
| 4,485,673 A | 12/1984 | Stern .......................... 73/304 |
| 4,528,855 A | 7/1985 | Singh ......................... 73/721 |
| 4,562,744 A | 1/1986 | Hall et al. ................ 73/861.02 |
| 4,598,381 A | 7/1986 | Cucci ......................... 364/558 |

(Continued)

FOREIGN PATENT DOCUMENTS

DE  37 41 648 A1  7/1988

(Continued)

OTHER PUBLICATIONS

"Notification of Transmittal of the International Search Report and The Written Opinion of the International Searching Authority, or the Declaration", Application No. PCT/US2006/046924, filed Dec. 11, 2006, 13 pages.

(Continued)

Primary Examiner—Timothy Edwards, Jr.
(74) Attorney, Agent, or Firm—Westman, Champlin & Kelly, P.A.

(57) ABSTRACT

A process variable transmitter for use with a removable operator interface has a non-volatile memory and a latching component. The non-volatile memory stores device settings. The latching component prohibits changes to transmitter settings if the removable operator interface is absent. Circuitry in the transmitter detects the presence of the removable operator interface. The removable operator interface can include zero and span settings.

19 Claims, 4 Drawing Sheets

U.S. PATENT DOCUMENTS

| | | | |
|---|---|---|---|
| 4,602,344 A | 7/1986 | Ferretti et al. | 364/509 |
| 4,617,607 A | 10/1986 | Park et al. | 361/283 |
| D287,827 S | 1/1987 | Broden | D10/46 |
| 4,644,797 A | 2/1987 | Ichikawa et al. | 73/706 |
| 4,653,330 A | 3/1987 | Hedtke | 73/756 |
| 4,677,841 A | 7/1987 | Kennedy | 73/30 |
| 4,745,810 A | 5/1988 | Pierce et al. | 73/706 |
| D296,995 S | 8/1988 | Lee | D10/46 |
| D297,314 S | 8/1988 | Hedtke | D10/46 |
| D297,315 S | 8/1988 | Pierce et al. | D10/85 |
| 4,783,659 A | 11/1988 | Frick | 340/870.37 |
| 4,791,352 A | 12/1988 | Frick et al. | 324/60 |
| 4,798,089 A | 1/1989 | Frick et al. | 73/706 |
| 4,809,550 A | 3/1989 | Faulconer | 73/300 |
| 4,818,994 A | 4/1989 | Orth et al. | 340/870.21 |
| 4,825,704 A | 5/1989 | Aoshima et al. | 73/861.42 |
| 4,833,922 A | 5/1989 | Frick et al. | 73/756 |
| 4,850,227 A | 7/1989 | Luettgen et al. | 73/708 |
| 4,866,989 A | 9/1989 | Lawless | 73/756 |
| 4,881,412 A | 11/1989 | Northedge | 73/861.04 |
| 4,906,971 A | 3/1990 | Schmid et al. | 340/462 |
| 4,930,353 A | 6/1990 | Kato et al. | 73/727 |
| 4,958,938 A | 9/1990 | Schwartz et al. | 374/208 |
| 4,970,898 A | 11/1990 | Walish et al. | 73/706 |
| 4,980,675 A | 12/1990 | Meisenheimer, Jr. | 340/626 |
| 5,000,047 A | 3/1991 | Kato et al. | 73/706 |
| D317,266 S | 6/1991 | Broden et al. | D10/46 |
| D317,269 S | 6/1991 | Selg | D10/52 |
| D318,432 S | 7/1991 | Broden et al. | D10/46 |
| 5,028,746 A | 7/1991 | Petrich | 191/12.2 R |
| 5,035,140 A | 7/1991 | Daniels et al. | 73/290 |
| 5,051,937 A | 9/1991 | Kawate et al. | 364/571.01 |
| 5,058,437 A | 10/1991 | Chaumont et al. | 73/861.21 |
| 5,060,108 A | 10/1991 | Baker et al. | 361/283 |
| 5,070,732 A | 12/1991 | Duncan et al. | 73/431 |
| 5,083,091 A | 1/1992 | Frick et al. | 324/678 |
| 5,083,288 A * | 1/1992 | Somlyody et al. | 702/116 |
| 5,087,871 A | 2/1992 | Losel | 323/299 |
| 5,094,109 A | 3/1992 | Dean et al. | 73/718 |
| D329,619 S | 9/1992 | Cartwright | D10/52 |
| 5,142,914 A | 9/1992 | Kusakabe et al. | 73/723 |
| 5,157,972 A | 10/1992 | Broden et al. | 73/718 |
| 5,162,725 A | 11/1992 | Hodson et al. | 324/115 |
| 5,187,474 A | 2/1993 | Kielb et al. | 340/870.18 |
| 5,212,645 A | 5/1993 | Wildes et al. | 364/463 |
| 5,227,782 A | 7/1993 | Nelson | 340/870.11 |
| 5,236,202 A | 8/1993 | Krouth et al. | 277/164 |
| 5,245,333 A | 9/1993 | Anderson et al. | 340/870.3 |
| 5,248,167 A | 9/1993 | Petrich et al. | 285/23 |
| D342,456 S | 12/1993 | Miller et al. | D10/60 |
| 5,276,631 A | 1/1994 | Popovic et al. | 364/571.04 |
| 5,287,746 A | 2/1994 | Broden | 73/706 |
| 5,353,200 A | 10/1994 | Bodin et al. | 361/816 |
| 5,369,386 A | 11/1994 | Alden et al. | 335/206 |
| 5,377,547 A | 1/1995 | Kusakabe et al. | 73/723 |
| 5,381,355 A | 1/1995 | Birangi et al. | 364/724.01 |
| D358,784 S | 5/1995 | Templin, Jr. et al. | D10/96 |
| 5,436,824 A | 7/1995 | Royner et al. | 363/89 |
| 5,448,180 A | 9/1995 | Kienzler et al. | 326/15 |
| 5,469,150 A | 11/1995 | Sitte | 340/825.07 |
| 5,471,885 A | 12/1995 | Wagner | 73/862.041 |
| D366,000 S | 1/1996 | Karas et al. | D10/46 |
| D366,218 S | 1/1996 | Price et al. | D10/52 |
| 5,495,768 A | 3/1996 | Louwagie et al. | 73/706 |
| 5,498,079 A | 3/1996 | Price | 374/208 |
| 5,502,659 A | 3/1996 | Braster et al. | 364/571.01 |
| 5,524,333 A | 6/1996 | Hogue et al. | 29/593 |
| 5,524,492 A | 6/1996 | Frick et al. | 73/706 |
| 5,546,804 A | 8/1996 | Johnson et al. | 73/431 |
| 5,600,782 A | 2/1997 | Thomson | 395/182.02 |
| 5,606,513 A | 2/1997 | Louwagie et al. | 364/510 |
| 5,650,936 A | 7/1997 | Loucks et al. | 364/483 |
| 5,656,782 A | 8/1997 | Powell, II et al. | 73/756 |
| 5,665,899 A | 9/1997 | Willcox | 73/1.63 |
| 5,668,322 A | 9/1997 | Broden | 73/756 |
| 5,669,713 A | 9/1997 | Schwartz et al. | 374/1 |
| 5,670,722 A | 9/1997 | Moser et al. | 73/756 |
| 5,677,476 A | 10/1997 | McCarthy et al. | 73/29.01 |
| 5,710,552 A | 1/1998 | McCoy et al. | 340/870.21 |
| 5,754,596 A | 5/1998 | Bischoff et al. | 375/295 |
| 5,764,928 A | 6/1998 | Lancott | 395/285 |
| 5,823,228 A | 10/1998 | Chou | 137/597 |
| 5,870,695 A | 2/1999 | Brown et al. | 702/138 |
| 5,899,962 A | 5/1999 | Louwagie et al. | 702/138 |
| 5,920,016 A | 7/1999 | Broden | 73/756 |
| 5,948,988 A | 9/1999 | Bodin | 73/706 |
| 5,954,526 A | 9/1999 | Smith | 439/136 |
| 5,955,684 A | 9/1999 | Gravel et al. | 73/866.5 |
| 5,973,942 A | 10/1999 | Nelson et al. | 363/21 |
| 5,983,727 A | 11/1999 | Wellman et al. | 73/724 |
| 5,988,203 A | 11/1999 | Hutton | 137/597 |
| 6,002,996 A | 12/1999 | Burks et al. | 702/188 |
| 6,005,500 A | 12/1999 | Gaboury et al. | 341/43 |
| 6,006,338 A | 12/1999 | Longsdorf et al. | 713/340 |
| 6,013,108 A | 1/2000 | Karolys et al. | 792/189 |
| 6,035,240 A | 3/2000 | Moorehead et al. | 700/2 |
| 6,038,927 A | 3/2000 | Karas | 73/706 |
| 6,047,219 A | 4/2000 | Eidson | 700/2 |
| 6,050,145 A | 4/2000 | Olson et al. | 73/706 |
| 6,058,441 A | 5/2000 | Shu | 710/100 |
| 6,059,254 A | 5/2000 | Sundet et al. | 248/678 |
| 6,104,875 A * | 8/2000 | Gallagher et al. | 717/168 |
| 6,105,437 A | 8/2000 | Klug et al. | 73/756 |
| 6,111,888 A | 8/2000 | Green et al. | 370/461 |
| 6,115,831 A | 9/2000 | Hanf et al. | 714/43 |
| 6,123,585 A | 9/2000 | Hussong et al. | 439/652 |
| 6,131,467 A | 10/2000 | Miyano et al. | 73/756 |
| 6,140,952 A | 10/2000 | Gaboury | 341/143 |
| 6,151,557 A | 11/2000 | Broden et al. | 702/47 |
| 6,175,770 B1 | 1/2001 | Bladow | 700/2 |
| 6,177,877 B1 | 1/2001 | Munyon | 340/815.4 |
| D439,177 S | 3/2001 | Fandrey et al. | |
| D439,178 S | 3/2001 | Fandrey et al. | |
| D439,179 S | 3/2001 | Fandrey et al. | |
| D439,180 S | 3/2001 | Fandrey et al. | |
| D439,181 S | 3/2001 | Fandrey et al. | |
| 6,216,172 B1 | 4/2001 | Kolblin et al. | 709/253 |
| 6,219,876 B1 | 4/2001 | Blum | 15/215 |
| D441,672 S | 5/2001 | Fandrey et al. | |
| 6,233,532 B1 | 5/2001 | Boudreau et al. | 702/89 |
| 6,267,010 B1 | 7/2001 | Hatanaka et al. | 73/756 |
| 6,285,964 B1 | 9/2001 | Babel et al. | 702/121 |
| 6,295,875 B1 | 10/2001 | Frick et al. | 73/718 |
| 6,298,454 B1 | 10/2001 | Schleiss et al. | 714/37 |
| 6,311,568 B1 | 11/2001 | Kleven | 73/861.42 |
| 6,321,166 B1 | 11/2001 | Evans et al. | 702/50 |
| 6,415,188 B1 | 7/2002 | Fernandez et al. | 700/67 |
| 6,417,778 B2 | 7/2002 | Blum et al. | 340/815.4 |
| 6,421,570 B1 | 7/2002 | McLaughlin et al. | 700/2 |
| 6,457,367 B1 | 10/2002 | Behm et al. | 73/753 |
| 6,460,094 B1 | 10/2002 | Hanson et al. | 710/8 |
| 6,484,107 B1 | 11/2002 | Roper et al. | 702/50 |
| 6,487,912 B1 | 12/2002 | Behm et al. | 73/753 |
| 6,504,489 B1 | 1/2003 | Westfield et al. | 340/870.3 |
| 6,510,740 B1 | 1/2003 | Behm et al. | 73/708 |
| 6,511,337 B1 | 1/2003 | Fandrey et al. | 739/320 |
| 6,516,672 B2 | 2/2003 | Wang | 73/718 |
| D471,829 S | 3/2003 | Dennis et al. | D10/85 |
| D472,831 S | 4/2003 | Dennis et al. | D10/85 |
| 6,546,805 B2 | 4/2003 | Fandrey et al. | 73/753 |
| 6,568,279 B2 | 5/2003 | Behm et al. | 73/756 |
| 6,571,132 B1 | 5/2003 | Davis et al. | 700/2 |
| 6,593,857 B1 | 7/2003 | Roper et al. | 340/870 |
| 6,609,427 B1 | 8/2003 | Westfield et al. | 73/753 |

| | | | |
|---|---|---|---|
| 6,662,662 B1 | 12/2003 | Nord et al. | 73/715 |
| 6,701,274 B1 | 3/2004 | Eryurek et al. | 702/140 |
| 6,765,068 B2 | 7/2004 | Nelson et al. | 375/257 |
| 6,898,980 B2 | 5/2005 | Behm et al. | 73/756 |
| 2002/0108448 A1 | 8/2002 | Behm et al. | 73/753 |
| 2004/0217877 A1 | 11/2004 | Kokonaski et al. | 340/815.4 |
| 2005/0056106 A1 | 3/2005 | Nelson et al. | 73/866.3 |
| 2005/0062600 A1* | 3/2005 | Olsen | 340/506 |

FOREIGN PATENT DOCUMENTS

| | | |
|---|---|---|
| DE | 4020318 | 1/1991 |
| DE | G 91 09 176.4 | 10/1991 |
| DE | 197 45 244 A1 | 4/1998 |
| DE | 299 03 260 U1 | 5/2000 |
| DE | 10054740 | 4/2002 |
| EP | 0 063 685 A1 | 11/1982 |
| EP | 0 167 941 A2 | 1/1986 |
| EP | 0 214 801 A1 | 3/1987 |
| EP | 0 223 300 A2 | 5/1987 |
| EP | 0 268 742 A1 | 6/1988 |
| EP | 0 639 039 A1 | 2/1995 |
| EP | 0 903 651 A1 | 3/1999 |
| GB | 2190944 | 12/1987 |
| JP | 354143248 | 11/1979 |
| JP | 63124916 | 5/1988 |
| JP | 401313038 | 12/1989 |
| JP | 06133850 | 5/1994 |
| JP | 08292438 | 11/1996 |
| JP | 10009938 | 1/1998 |
| JP | 2000121470 | 10/1998 |
| WO | WO 88/01417 | 2/1988 |
| WO | WO 89/02578 | 3/1989 |
| WO | WO 89/04089 | 5/1989 |
| WO | WO 90/15975 | 12/1990 |
| WO | WO 91/18266 | 11/1991 |
| WO | WO 96/34264 | 10/1996 |
| WO | WO 98/48489 | 10/1998 |
| WO | WO 00/23776 | 4/2000 |
| WO | WO 2004/034037 | 4/2004 |

OTHER PUBLICATIONS

Product Data Sheet No. 00813-0100-4378, "Model 751 Field Signal Indicator", by Rosemount Inc., Eden Prairie, Minnesota, (1997).
Product Data Sheet No. 00813-0100-4731, "APEX™ Radar Gauge", by Rosemount Inc., Eden Prairie, Minnesota, (1998).
Product Data Sheet No. 00813-0100-4640, "Model 3201 Hydrostatic Interface Unit", from the Rosemount Comprehensive Product Catalog, published 1998, by Rosemount Inc., Eden Prairie, Minnesota.
Product Data Sheet No. 00813-0100-4003, "Model 8800A", by Rosemount Inc., Eden Prairie, Minnesota, (1998).
Product Data Sheet No. 00813-0100-4773, "Model 8742C—Magnetic Flowmeter Transmitter with FOUNDATION™ Fieldbus", from the Rosemount Comprehensive Product Catalog, published 1998, by Rosemount Inc., Eden Prairie, Minnesota.
"Rosemount Model 8732C Magnetic Flowmeter Transmitter", by Rosemount Inc., Eden Prairie, Minnesota, (1998).
Product Data Sheet No. 00813-0100-4263, "Model 444 Alphaline® Temperature Transmitters", by Rosemount Inc., Eden Prairie, Minnesota, (1997).
Product Data Sheet No. 00813-0100-4769, "Model 3244MV Multivariable Temperature Transmitter with FOUNDATION™ Fieldbus", by Rosemount Inc., Eden Prairie, Minnesota, (1998).
Product Data Sheet No. 00813-0100-4724, "Models 3144 and 3244MV Smart Temperature Transmitters", by Rosemount Inc., Eden Prairie, Minnesota, (1998).
Product Data Sheet No. 00813-0100-4738, "Model 3095FB Multivariable™ Transmitter with Modbus™ Protocol", by Rosemount Inc., Eden Prairie, Minnesota, (1996, 1997).
Product Data Sheet No. 00813-0100-4001, "Model 3051 Digital Pressure Transmitter for Pressure, Flow, and Level Measurement", by Rosemount Inc., Eden Prairie, Minnesota (1998).

Product Data Sheet No. 00813-0100-4698, "Model 2090F Sanitary Pressure Transmitter", by Rosemount Inc., Eden Prairie, Minnesota, (1998).
Product Data Sheet No. 00813-0100-4690, "Model 2088 Economical Smart Pressure Transmitter", by Rosemount Inc., Eden Prairie, Minnesota, (1998).
Product Data Sheet No. 00813-0100-4592, "Model 2024 Differential Pressure Transmitter", by Rosemount Inc., Eden Prairie, Minnesota, (1987-1995).
Product Data Sheet No. 00813-0100-4360, "Model 1151 Alphaline® Pressure Transmitters", by Rosemount Inc., Eden Prairie, Minnesota, (1998).
Product Data Sheet No. 00813-0100-4458, "Model 1135F Pressure-to-Current Converter", by Rosemount Inc., Eden Prairie, Minnesota, (1983, 1986, 1994).
"Single Chip Senses Pressure and Temperature," *Machine Design*, 64 (1992) May 21, No. 10.
Brochure: "Reduce Unaccounted-For Natural Gas with High-Accuracy Pressure Transmitters," Rosemount Inc. Measurement Division, Eden Prairie, Minnesota, ADS 3073, May 1991, pp. 1-4.
Technical Information Bulletin, "Liquid Level Transmitter Model DB40RL Sanitary Sensor *deltapilot*," Endress+Hauser, Greenwood, Indiana, Sep. 1992, pp. 1-8.
"The Digitisation of Field Instruments" W. Van Der Bijl, *Journal A*, vol. 32, No. 3, 1991, pp. 62-65.
Specification Summary, "TELETRANS™ 3508-30A Smart Differential Pressure Transmitter," (undated) Bristol Babcock, Inc., Watertown, CT, 06795.
Specification Summary, "TELETRANS™ 3508-10A Smart Pressure Transmitter," (undated) Bristol Babcock, Inc., Watertown, CT, 06795.
Specification Summary, "AccuRate Advanced Gas Flow Computer, Model GFC 3308," (undated) Bristol Babcock, Inc., Watertown, CT, 06795.
Product Data Sheet PDS 4640, "Model 3201 Hydrostatic Interface Unit," Mar. 1992, Rosemount Inc., Eden Prairie, MN 55344.
Product Data Sheet PDS 4638, "Model 3001CL Flush-Mount Hydrostatic Pressure Transmitter," Jul. 1992, Rosemount Inc., Eden Prairie, MN 55344.
"Flow Measurement," *Handbook of Fluid Dynamics*, V. Streeter, Editor-in-chief, published by McGraw-Hill Book Company, Inc. 1961, pp. 14-4 to 14-15.
"Precise Computerized In-Line Compressible Flow Metering," *Flow—Its Measurement and Control in Science and Industry*, vol. 1, Part 2, Edited by R. Wendt, Jr., Published by American Institute of Physics et al, (undated) pp. 539-540.
"A Systems Approach," Dr. C. Ikoku, *Natural Gas Engineering*, PennWell Books, (undated) pp. 256-257.
"Methods for Volume Measurement Using Tank-Gauging Devices Can Be Error Prone," F. Berto, *The Advantages of Hydrostatic Tank Gauging Systems*, undated reprint from *Oil & Gas Journal*.
"Hydrostatic Tank Gauging—Technology Whose Time Has Come," J. Berto, *Rosemount Measurement Division Product Feature*, undated reprint from *INTECH*.
"Pressure Sensors Gauge Tank Level and Fluid Density," *Rosemount Measurement Division Product Feature*, undated reprint from *Prepared Foods* (Copyrighted 1991 by Gorman Publishing Company).
"Low Cost Electronic Flow Measurement System," *Tech Profile*, May 1993, Gas Research Institute, Chicago, IL.
"Development of an Integrated EFM Device for Orifice Meter Custody Transfer Applications," S.D. Nieberle et al., *American Gas Association Distribution/Transmission Conference & Exhibit*, May 19, 1993.
Advertisement, AccuRate Model 3308 Integral Smart DP/P/T Transmitter, (undated) Bristol Babcock, Inc., Watertown, CT 06795.
Advertisement, Model 3508 DP Transmitter, *Control Engineering*, Dec. 1992, Bristol Babcock, Inc., Watertown, CT 06795.
"Smart Transmitters Tear up The Market," C. Polsonetti, *INTECH*, Jul. 1993, pp. 42-45.
"MicroLAN Design Guide", Dallas Semiconductor, Tech Brief No. 1, (undated).
"Bosch CAN Specification Version 2.0", by Robert Bosch GmbH, pp. 1-68 including pp. -1- and -2-, (Sep. 1991).

Product Data Sheet No. 00813-0100-4001, "Digital Pressure Transmitter for Pressure, Flow, and Level Measurement", by Rosemount Inc., (1998).

"Claudius Ptolemy (100?-170? AD)", *M&C News*, 7 pages, (Apr. 1994).

American National Standard, "Hydraulic Fluid Power-Solenoid Piloted Industrial Valves-Interface Dimensions for Electrical Connectors", National Fluid Power Association, Inc., 10 pages, (Aug. 1981).

2 pages downloaded from http://www.interlinkbt.com/PRODUCT/IBT_PROD/DN/CN-DM_PN/EURO-DP.HTM dated Sep. 15, 2000.

4 pages downloaded from http://www.interlinkbt.com/PRODUCT/IBT_PROD/dn/EUR-CON/Euro-fwc.htm dated Sep. 15, 2000.

3 pages from TURK Cable Standards, by Turk, Inc., Minneapolis, Minnesota.

"Notification of Transmittal of the International Search Report or Declaration" for International application Serial No. PCT/US00/26561.

"Notification of Transmittal of the International Search Report or Declaration" for International application Serial No. PCT/US00/26488.

"Notification of Transmittal of the International Search Report or Declaration" for International application Serial No. PCT/US00/26563.

"Notification of Transmittal of the International Search Report or Declaration" for International application Serial No. PCT/US01/13993.

"Notification of Transmittal of the International Search Report or Declaration" for International application Serial No. PCT/US01/14521.

U.S. Appl. No. 10/893,162, filed Jul. 16, 2004.

"Vegacomms Products", printout from website www.vegacontrols.co.uk.

"Operating Instruction—Indication and Adjustment Module PLICSCOM", pp. 2-35.

Examination Report issued by the European Patent Office for Application No. 06845044.4, filed Dec. 11, 2006, dated Dec. 18, 2008; 3 pages.

* cited by examiner

TRANSMITTER WITH REMOVABLE LOCAL OPERATOR INTERFACE

BACKGROUND OF THE INVENTION

The present invention is directed to field devices for use in industrial processes, and more particularly, to removable operator interfaces for operator interaction with such field devices.

Industrial field devices (sometimes referred to as industrial process transmitters) typically include circuitry within the field device that is adapted to sense a process variable associated with an industrial process. The process variable can include temperature, pressure (including absolute or gauge pressure), fluid flow rate, viscosity, pH, and various other process variables, depending on the particular implementation.

Such transmitters typically include a mechanism for calibration. For example, in 4-20 mA transmitters, a minimum or zero value of the parameter sensed can be adjusted to correspond to the minimum output (for example a current of 4 mA). Similarly, a maximum value of the sensed parameter can be set to a maximum output (for example, a current of 20 mA). Zero and span potentiometers can be used to calibrate the minimum and maximum settings of the transmitter.

Since the minimum and maximum parameter values may vary from one installation to the next, it is common for manufacturers of industrial field devices to provide a button or screw that the user can use locally on each field device to set its zero and span reference points. Depending on the specific field device, the location of the button or screw can be internal to the field device housing, such as within a cover of the field device, or it can be external to the device on the top or side of the device. Alternatively, the zero and span settings can be accessed using a local operator interface (LOI), such as a keypad that is coupled to the field device.

Industrial field devices or process transmitters employed in process industries such as pharmaceutical, biotechnology, or food and beverage industries, often are required to satisfy special requirements related to verification and validation of the processes used to manufacture the product. Included in the verification and validation process is the requirement for routine and periodic calibration of the transmitters. While access to such systems is typically controlled to prevent unauthorized access, providing such adjustment means on each field device or transmitter makes it possible for undesired and/or unauthorized changes to be made to device settings.

Therefore, there is an on-going need in monitoring and process control field devices for a means for adjusting setting of the transmitter that makes adjustment easy and simple for the operator while minimizing the number of operators authorized to make the adjustment. Embodiments of the present invention provides solutions to these and other problems and provide advantages over the prior art.

SUMMARY

A process device includes a non-volatile memory adapted to store process device settings and communication circuitry for communicating with a removable device. The removable device is used to configure the process device settings. A latching component is configured to latch the process device settings.

DETAILED DESCRIPTION

In embodiments of the present invention, an industrial process variable transmitter is configured to test for a connected removable interface module such as LOI (Local Operator Interface) module. Circuitry within the transmitter is adapted to latch transmitter settings against subsequent changes if the removable interface module is disconnected.

Figure 1:
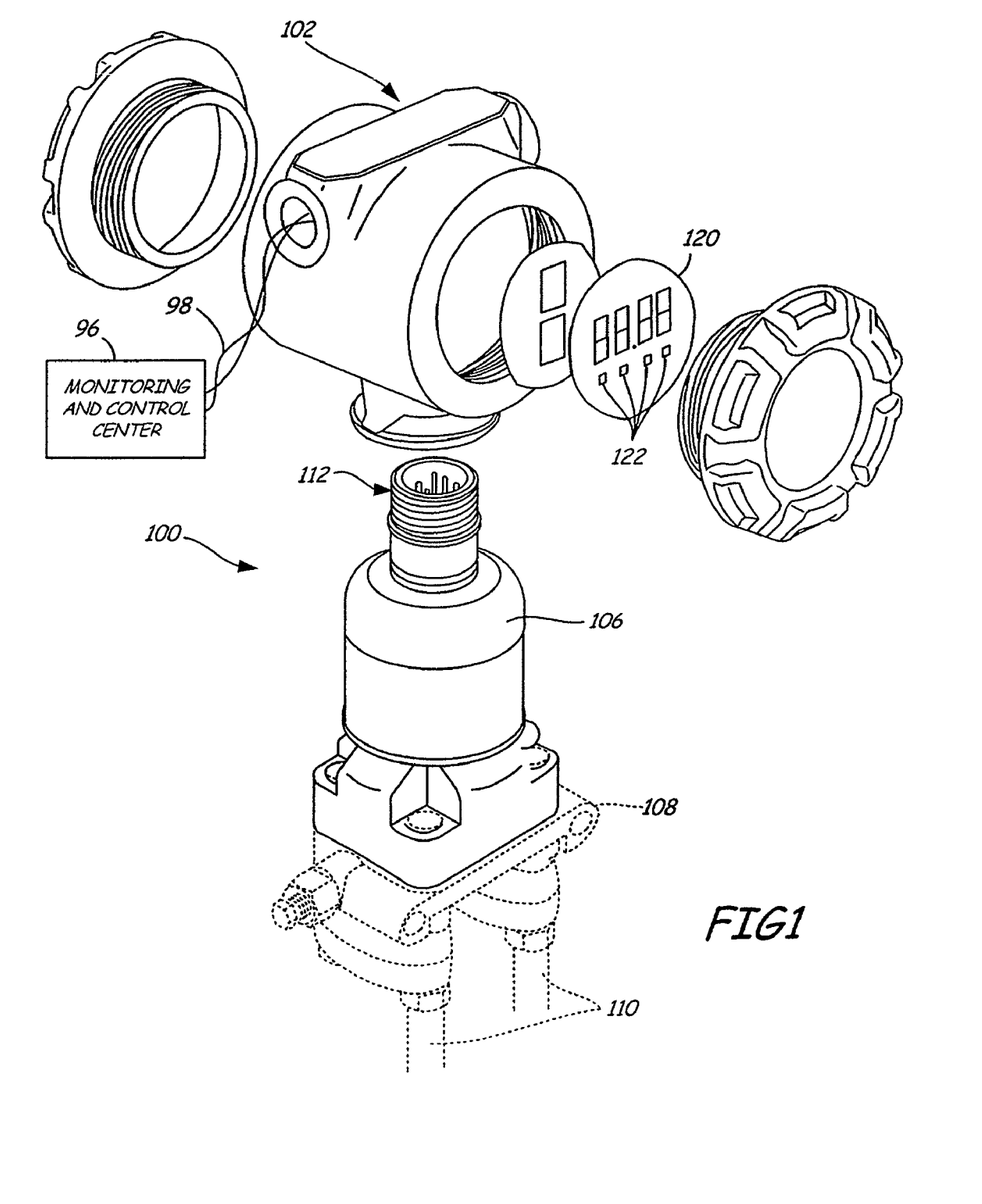
FIG. 1 is an exploded view of a transmitter and feature module according to an embodiment of the present invention.

FIG. 1 is an exploded view of a two-wire, modular differential pressure transmitter 100 within which embodiments of the invention may be implemented. The transmitter 100 is a two-wire transmitter that uses the same two wires 98 for power and for signal transmission to a remote monitoring and control center 96. Transmitter 100 is only one example of a suitable process monitoring and control device and is not intended to suggest any limitation as to the scope of use or functionality of the present invention.

The transmitter 100 includes a feature module 102, and a pressure sensing module 106. The pressure sensing module 106 can be attached to a pipe or conduit of an industrial process, for example, by a flange 108 and threaded pipes 116.

The feature module 102 is sealed to the pressure sensing module 106 and is adapted to enclose electronic circuitry (shown and discussed below in greater detail) for the transmitter 100. An electrical connector 112 that is preferably hermetically sealed, includes a number of contacts which provide an electrical interconnect 208 shown in FIG. 2. One type of removable input interface is a local operator interface (LOI) 120 having a liquid crystal display (LCD) circuit having buttons 122 which are electrically coupled to electrical interconnect 208. The LOI 120 is coupled to the transmitter 100 via an interconnect board within the feature module 102. The LOI 120 is used to control settings within the transmitter 102.

Figure 2:
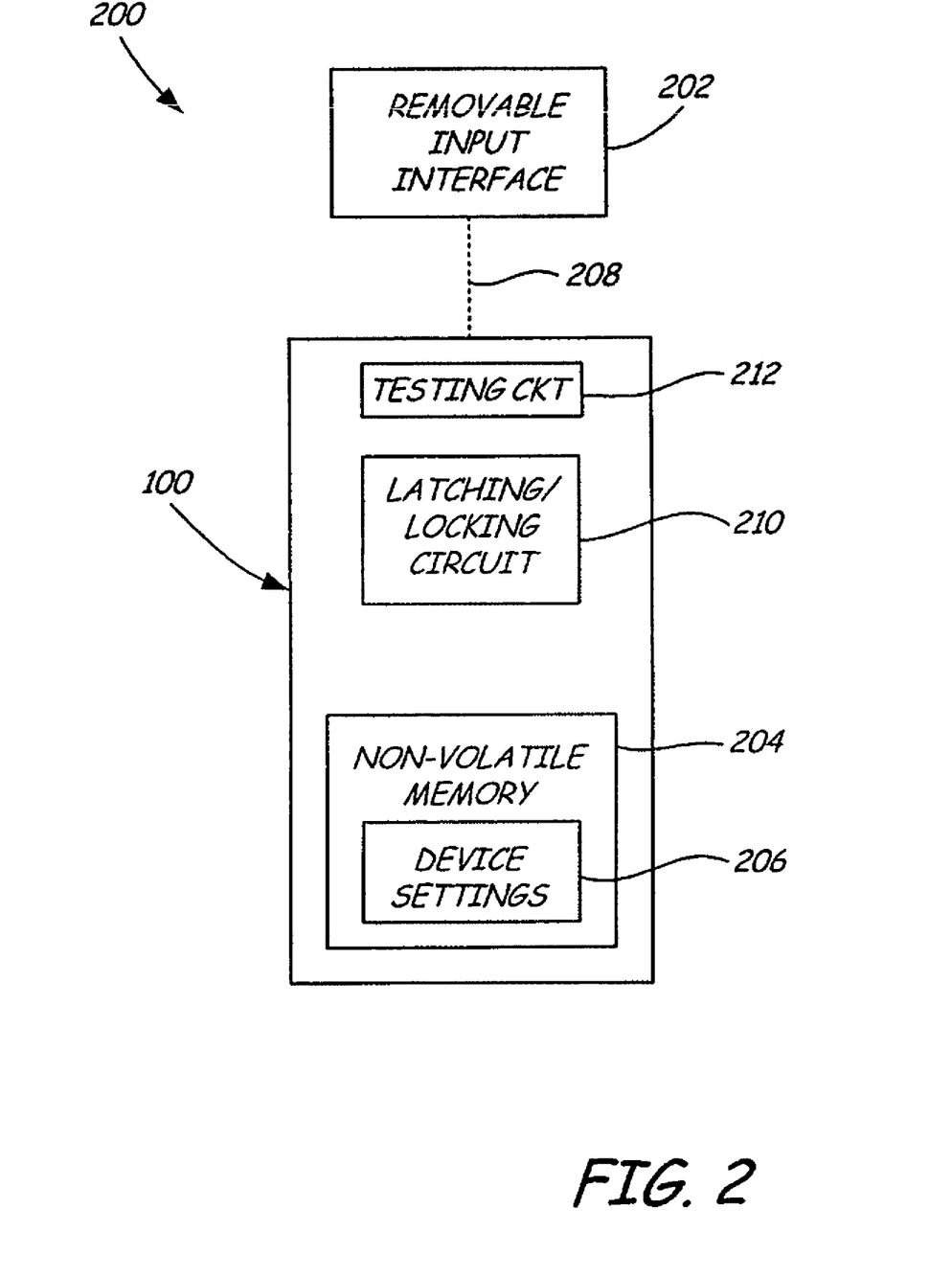
FIG. 2 is a simplified block diagram of a removable local operator interface coupled to the transmitter of FIG. 1.

FIG. 2 is a simplified block diagram 200 showing transmitter 100. A removably coupled removable input interface 202 is shown as removably coupled to the transmitter 100. Removable input interface 202 couples to electrical circuitry within transmitter 100 and is used to set parameters of transmitter 100. A non-volatile memory 204 is illustrated in FIG. 2 in which the device settings 206 are stored. Removable input interface 202 couples to transmitter 100 over electrical interconnect 208. Latching/locking circuitry 210 within the transmitter 100 is configured to latch a condition of switches or other inputs from removable input interface 202 such that removable input interface 202 can be disconnected from the transmitter 100. For example, the last state switches on the removable input interface 202 can be latched and an appropriate input will be presented to circuitry within transmitter 100. The latching can be performed in hardware or in software. The removable input interface 202 is "hot swappable" and can be selectively coupled to transmitter 100 without powering down circuitry in transmitter 100. Latching circuitry 210 can comprise a microprocessor configured to implement software instructions store in a memory such as memory 204.

Figure 3:
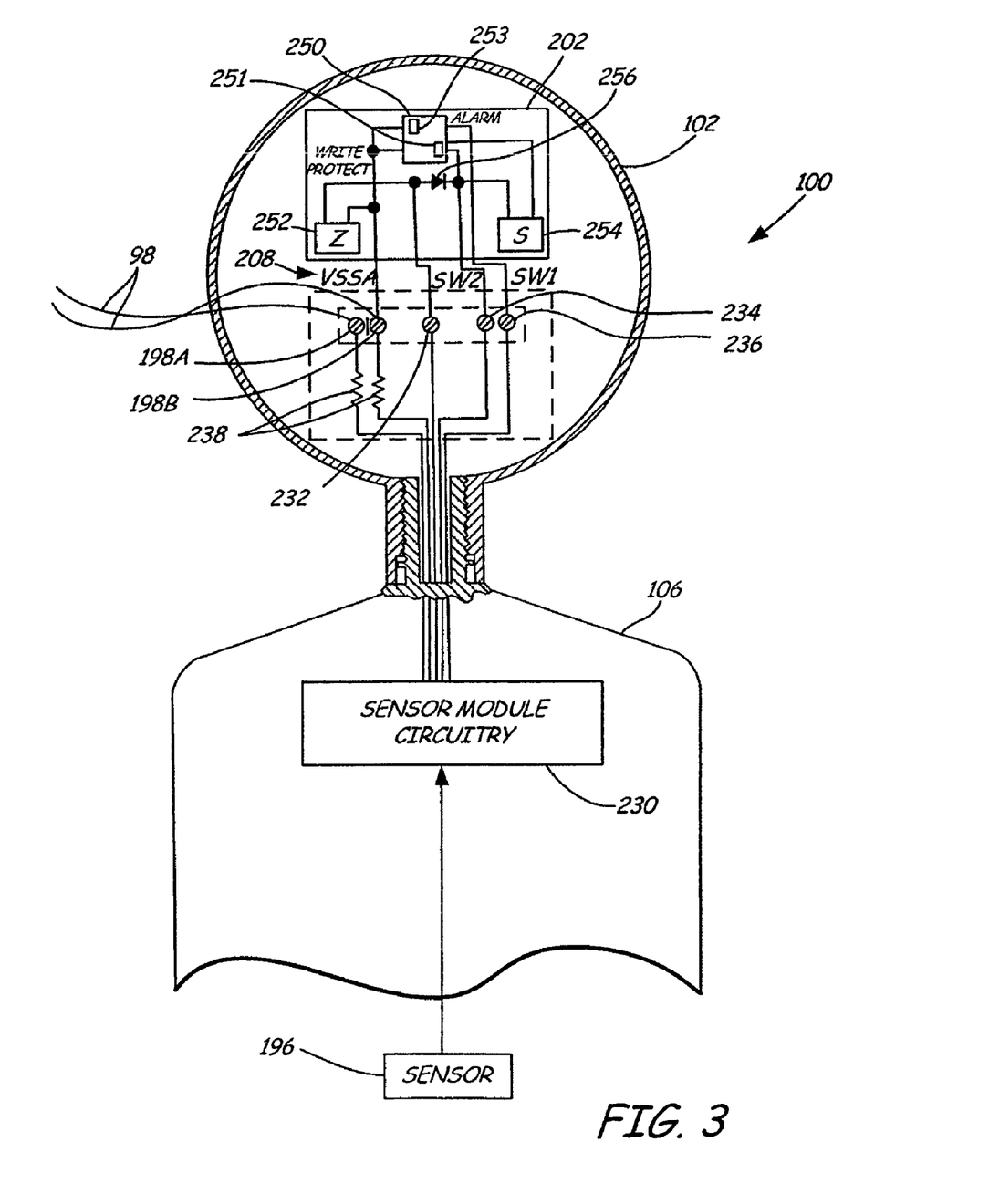
FIG. 3 is a simplified diagram of an industrial process variable transmitter in partial cross-section illustrating a detachable LOI circuit.

FIG. 3 is a cross-sectional view of transmitter 100 showing feature module 102 in greater detail. In the configuration of FIG. 3, the removable input interface (LOI) 202 is shown coupled to terminals of the feature module 102 and to sensor module circuitry 230 carried in sensor module 106 over electrical interconnect 208. The non-volatile memory 204, device settings 206, latching/locking circuit 210 and testing circuit 212 illustrated in FIG. 2 can be implemented in sensor module circuitry 230. A sensor 196 couples to sensor module circuitry 230. The sensor is configured to sense a process variable.

As illustrated in FIG. 3, feature module 102 is threaded onto sensor module 106. Connection terminals 198A and 198B, 232, 234, and 236 are illustrated in feature module 102. Terminals 198A and 198B are used for coupling to two-wire process control loop 98 and provide a connection to sensor module circuitry 230 through resistors 238. Terminal 198B also couples to zero switch 252. The electrical interconnect 208 for coupling to local operator interface 202 is provided through terminals 198B, 232, 234 and 236. Terminal 232 can present a local databus connection such as a databus in accordance with the CAN (Controller Area Network) standard. Terminals 234 and 236 are used for adjusting device settings for transmitter 100. Terminal 198B provides a circuit common.

The removable input interface 202 includes a switch 250, zero switch 252, span switch 254 and diode 256. Switch 250 includes a write protect switch 251 and an alarm switch 253. The zero and span switches 252, 254 are used to set the zero and span settings of the transmitter 100. The write protect switch 251 can be used to place the device in a hardware write protect condition. In such a condition, device settings (206 in FIG. 2) of the transmitter 100 cannot be changed. The alarm switch 254 controls whether an alarm condition will be signaled with an alarm high output or an alarm low output from the transmitter 100.

In operation, the local operator interface 202 plugs into the electrical interconnect 208 using, for example, a blind mate connector. The connection preferably can occur without disturbing the connection to process control loop 98. The diode 256 is configured to connect between the databus 232 and one of the switch lines 234 and 236. Software within sensor module circuitry 230 is configured to sense the presence of diode 256. For example, the software can be configured to implement testing circuitry 212 to identify the presence of local operator interface 250 by detecting the presence of diode 256. In accordance with one aspect of the invention, the software within sensor module circuitry 230 is configured to periodically interrogate the electrical interconnect 208 to detect the presence of diode 256 during normal operation of transmitter 100. By monitoring the presence or absence of the diode 256, the software can determine if the switches, such as zero and span switches 252 or 254 and alarm switch 250 and write protect switch 251, are present or absent. If present, the software can then determine the state of switches 250, 251, 252 and 254. If absent, the software can latch and retain the last know settings.

The connections 198, 232, 234 and 236 are configured such that when local operator interface 202 is plugged into feature module 102, the connection to two-wire process control loop 98 is not severed and the transmitter circuitry does not lose power. With this configuration, the removable input interface 202 is "hot swappable" and can be selectively connected or disconnected from feature module 102 during operation of the transmitter 100. Additionally, an active device such as an LCD or the like can be selectively plugged into electrical interconnect 208 by removing the local operator interface 202.

Figure 4:
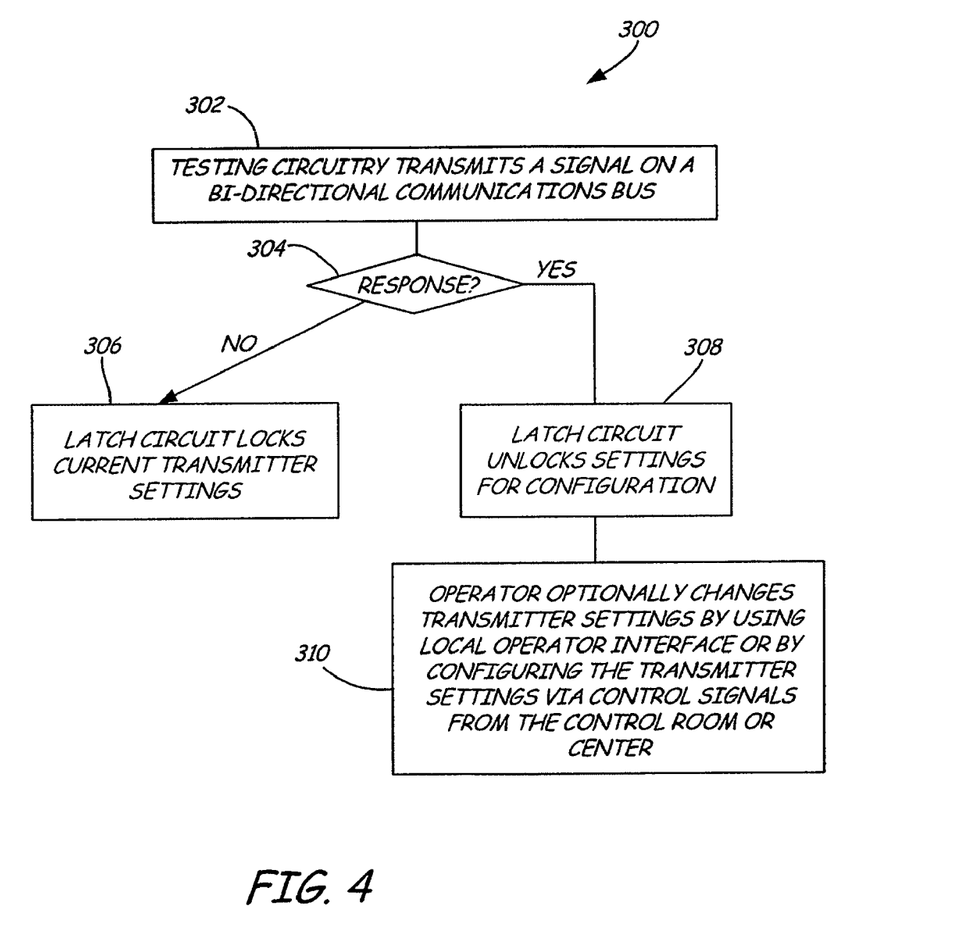
FIG. 4 is a simplified flow diagram of a process by which transmitter circuitry manages transmitter settings based on the presence of LOI circuitry.

FIG. 4 is a simplified block diagram 300 of software operating in sensor module circuitry 230 configured to operate in accordance with the present invention. At block 302, the software 300 tests for the presence of local operator interface 202 by detecting diode 256 shown in FIG. 3. If no response is returned at block 304, the latching/locking circuit 210 locks the current transmitter settings at block 306 and control is returned to block 302. (Note that the latching/locking circuit 210 can be implemented in software, hardware, or a combination).

If a response is returned at block 204, control is passed to block 308 and the latch circuitry 210 unlocks the device settings 206 shown in FIG. 2. In this configuration, at block 310, an operator can optionally change the transmitter settings by using the local operator interface 202. In another example configuration, the transmitter settings can be changed using control settings transmitted over two-wire process control loop 98 from, for example the monitoring and control center 96 or from a portable configuration tool.

The software in the transmitter 100 interrogates the databus and SW2 lines upon power up, when the transmitter 100 is going through its own initialization routine. Upon detecting the presence of the diode during the initialization routine and once the transmitter 100 reaches run mode, the software periodically interrogates the databus line and SW2 lines to determine if a zero or span button has been pushed or if the mode switch has changed state (on or off). If it does not detect the presence of a diode during initialization, the transmitter assumes the LOI is not installed and will not enable the manual input routine. However, circuitry in the transmitter can periodically check for the presence of diode 256 and responsively enable a manual input routine.

In general, the present invention makes use of a communication bus that selectively couples to the transmitter circuitry and which derives power from the transmitter circuitry to releasably connect to the transmitter to provide a hot swappable local operator interface. The local operator interface couples to the transmitter circuitry through an interconnect board that can be snapped or screwed onto the transmitter to establish a connection. In general, the device plugs into a terminal within the feature module 102. The present invention provides a modular pluggable local operator interface (LOI) that provides a key and lock system. The LOI device incorporates zero and span push buttons that can be used for setting, for example, the 4-20 milliAmp output of the transmitter against a known input. The LOI device can also incorporate other switches or jumpers that may be used to set alarms, to set alarm parameters, to calibrate the field device, and then to enable write protect mode. The LOI device is separate from power terminals of the transmitter so that it can be added or removed without disrupting power to the transmitter. Additionally, the LOI is interchangeable with a local LCD display or other optional circuitry. The LCD display may or may not employ zero/span buttons and mode switches.

The system includes hot swap capabilities, meaning that it can be installed and/or removed during the operation without disruption to the transmitter. This allows the user to plug the LOI/LCD into a working transmitter, make any necessary adjustments, and then remove the LOI/LCD. In a preferred embodiment, removal of the LOI/LCD leaves the configuration of the transmitter in a last known state and locks the transmitter settings in such a way that software cannot adjustment then. In this manner, a field device can be configured and locked in a last known state without concern that another mechanism can alter the field device settings. Although the above-description is directed to a process variable transmitter, the present invention is applicable to any device for use in an industrial process for controlling and/or monitoring the industrial process. In one specific configuration, the process device couples to a two-wire process control loop and receives power and communicates over the same two wire process control loop.

The diode allows the LOI board to be utilized as a virtual key unlock for a configuration purposes. Upon power up, the software running on the transmitter 100 proceeds through its initialization routine and if it detects the presence of the diode indicating an LOI board is attached. The software enables the manual input function. Periodically the software interrogates the databus and SW2 lines to determine if the diode is still present. If the diode is not present, the software ignores the input and rejects any changes in the state of the input. The software will continue to periodically and look for the presence of the diode to determine if the LOI 202 had been reconnected.

If the software does not detect the presence of a diode, it periodically sends a hail message on the databus line. If a peripheral databus device such as an LCD responds to the hail message, the software communicates with the device using the databus protocol. Using databus communications, the transmitter software can determine if the attached feature module includes a manual input (such as local zero and span buttons and mode switches). Input data is passed back to the transmitter software using the databus protocol. Subsequently, if the feature board quits functioning or is physically removed, the transmitter software begins checking for a diode and sends hail messages to re-establish communications.

Although the present invention has been described with reference to preferred embodiments, workers skilled in the art will recognize that changes may be made in form and detail without departing from the spirit and scope of the invention. For example, one specific databus protocol is the CAN protocol.

What is claimed is:

1. A process control device for use with a removable operator interface for use in monitoring or controlling an industrial process comprising:
   connectors configured to couple to the removable operator interface;
   test circuitry adapted to detect the presence of the removable operator interface coupled to the connectors and provide an output;
   a non-volatile memory adapted to store device settings in response to the removable operator interface; and
   a latching component adapted to prohibit subsequent changes to stored device settings if the removable operator interface is disconnected from the process device based upon the output from the test circuitry whereby the device settings cannot be changed when the removable operator interface is disconnected from the process device.

2. The apparatus of claim 1 wherein the process device comprises:
   an industrial process transmitter adapted to monitor a process variable of an industrial process.

3. The apparatus of claim 1 further comprising:
   a bi-directional communications bus adapted to communicatively couple the removable operator interface to the device.

4. The apparatus of claim 3 wherein the bi-directional communications bus is in accordance with the CAN protocol.

5. The apparatus of claim 1 wherein the device settings comprise:
   zero and span settings which define a range of output values corresponding to a range of measurement values for a process parameter.

6. The apparatus of claim 1 wherein the device settings comprise an alarm setting.

7. The apparatus of claim 1 wherein the device settings comprise a write protect setting.

8. The apparatus of claim 1 wherein the latching component is implemented in software.

9. The apparatus of claim 1 wherein the testing circuit detects a presence of a diode in the local operator interface.

10. The apparatus of claim 1 wherein the testing circuit periodically tests for the presence of the removable operator interface.

11. A method in a process device for storing device settings, comprising:
    attaching a local operator interface to the process device;
    detecting a connection between the local operator interface and the process device;
    reading a manual input from the local operator interface;
    storing device settings in the process device in response to the manual input if the local operator interface is detected by the step of detecting; and
    latching the stored devices settings and prohibiting subsequent changes to the device settings stored whereby the device settings cannot be changed if the local operator interface is removed from the process device based upon the step of detecting.

12. The method of claim 11 including monitoring a process variable of an industrial process.

13. The method of claim 11 further comprising:
    bi-directional communicating with adapted removable operator interface.

14. The method of claim 13 wherein the bi-directional communicating is in accordance with the CAN protocol.

15. The method of claim 11 wherein the device settings comprise:
    zero and span settings defining a range of output values corresponding to a range of measurement values for a process parameter.

16. The method of claim 11 wherein the device settings comprise an alarm setting.

17. The method of claim 11 wherein the device settings comprise a write protect setting.

18. The method of claim 11 including implementing the step of latching in software.

19. The method of claim 11 wherein detecting a connection comprises detecting a diode in the local operator interface.

\* \* \* \* \*